US011531982B2

(12) United States Patent
Thai et al.

(10) Patent No.: US 11,531,982 B2
(45) Date of Patent: Dec. 20, 2022

(54) OPTIMAL TRANSACTIONS SHARDING FOR SCALABLE BLOCKCHAIN

(71) Applicants: University of Florida Research Foundation, Inc., Gainesville, FL (US); Virginia Commonwealth University, Richmond, VA (US)

(72) Inventors: My T. Thai, Gainesville, FL (US); Thang N. Dinh, Richmond, VA (US); Lan Nguyen, Gainesville, FL (US); Truc Nguyen, Gainesville, FL (US)

(73) Assignees: University of Florida Research Foundation, Inc., Gainesville, FL (US); Virginia Commonwealth University, Richmond, VA (US)

( * ) Notice: Subject to any disclaimer, the term of this patent is extended or adjusted under 35 U.S.C. 154(b) by 373 days.

(21) Appl. No.: 16/910,670

(22) Filed: Jun. 24, 2020

(65) Prior Publication Data

US 2021/0406872 A1 Dec. 30, 2021

(51) Int. Cl.
*G06Q 20/36* (2012.01)
*G06Q 20/06* (2012.01)
(Continued)

(52) U.S. Cl.
CPC ..... *G06Q 20/3678* (2013.01); *G06Q 20/0658* (2013.01); *H04L 9/0637* (2013.01); *H04L 9/085* (2013.01)

(58) Field of Classification Search
CPC .......... G06Q 20/3678; G06Q 20/0658; G06Q 20/065; H04L 9/0637; H04L 9/085; H04L 9/50; H04L 9/3239; H04L 63/12
(Continued)

(56) References Cited

U.S. PATENT DOCUMENTS

| 11,418,323 B2* | 8/2022 | Syed ..................... H04L 9/0869 |
| 2019/0354518 A1* | 11/2019 | Zochowski ......... G06F 16/2379 |
| 2020/0286049 A1* | 9/2020 | Basu .................. G06Q 20/3827 |

FOREIGN PATENT DOCUMENTS

| WO | WO-2020173287 A1 * | 9/2020 | |
| WO | WO-2021050929 A1 * | 3/2021 | ........... H04L 63/123 |

OTHER PUBLICATIONS

Xie et al. ("A Survey on the Scalability of Blockchain System", IEEE Network—Sep./Oct. 2019, Sep. 26, 2019, pp. 166-173) (Year: 2019).*

(Continued)

*Primary Examiner* — James D Nigh
(74) *Attorney, Agent, or Firm* — Thomas | Horstemeyer, LLP

(57) ABSTRACT

An exemplary transaction sharding method comprises splitting a distributed ledger into a plurality of shards; and storing a shard across the subgroup of computer nodes associated with the shard. Such a method further comprises assigning a new transaction to one of the plurality of shards, wherein assigning the new transaction comprises iteratively choosing one of the plurality of shards; in each iteration, determining a transaction-to-shard score measuring a probability that a subgroup of computing nodes associated with the chosen shard for the current iteration would be involved in a same-shard transaction for the new transaction; in each iteration, determining a latency-to-shard score by estimating a confirmation latency of the new transaction under the chosen shard for the current iteration; and selecting the new transaction to be assigned to the shard based on a combination of the transaction-to-shard score and the latency-to-shard score.

20 Claims, 15 Drawing Sheets

(51) Int. Cl.
*H04L 9/06* (2006.01)
*H04L 9/08* (2006.01)

(58) Field of Classification Search
USPC .......................................................... 705/69
See application file for complete search history.

(56) References Cited

OTHER PUBLICATIONS

Yu et al. ("Survey: Sharding in Blockchains", IEEE Access, Jan. 24, 2020, pp. 14155-14181) (Year: 2020).*
Al-Bassam et al., Chainspace: A Sharded Contracts Platform, document code arXiv: 1708.03778v1, Aug. 12, 2017, 16 pages (Year: 2017).*
Forestier et al. ("Blockclique: Scaling through Transaction Sharding in a Multithreaded Block Graph", document code arXiv: 1803.09029v9, Feb. 8, 2020, 12 pages) (Year: 2020).*
Zhou et al. ("Solutions to Scalability of Blockchain: A Survey", IEEE Access, vol. 8, 2020, published Jan. 27, 2020, pp. 16440-16455) (Year: 2020).*
Nguyen et al. ("OptChain: Optimal Transactions Placement for Scalable Blockchain Sharding", 2019 IEEE 39th International Conference on Distributed Computing Systems (ICDCS), Jul. 31, 2019, pp. 525-535 (Year: 2019).*
Abbas et al. "Streaming Graph Partitioning: An Experimental Study," Proceedings of the VLDB Endowment, vol. 11. No. 11, pp. 1590-1603. 2018.
E. Kokoris-Kogias et at "OmniLedger: A Secure, Scale-Out, Decentralized Ledger via Sharding," IEEE Symposium on Security and Privacy (SP), 16 pages. 2018.

\* cited by examiner

OPTIMAL TRANSACTIONS SHARDING FOR SCALABLE BLOCKCHAIN

CROSS-REFERENCE TO RELATED APPLICATION

This application claims priority to U.S. provisional application entitled, "Optimal Transactions Sharding for Scalable Blockchain," having Ser. No. 62/868,214, filed Jun. 28, 2019, which is entirely incorporated herein by reference.

TECHNICAL FIELD

The present disclosure is related to the computer storage of digital assets.

BACKGROUND

Blockchain has emerged as a disruptive and transformational technology, with great potential and benefits, offering a promising new decentralized economy without the risk of single point of failures, monopoly, or censorship. Unfortunately, the performance level of existing decentralized systems based on the blockchain technology is too low to realize that vision, e.g., 7 transactions per second (tps) and up to 60 minutes confirmation time for Bitcoin, and 10 tps/12 minutes for Ethereum.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
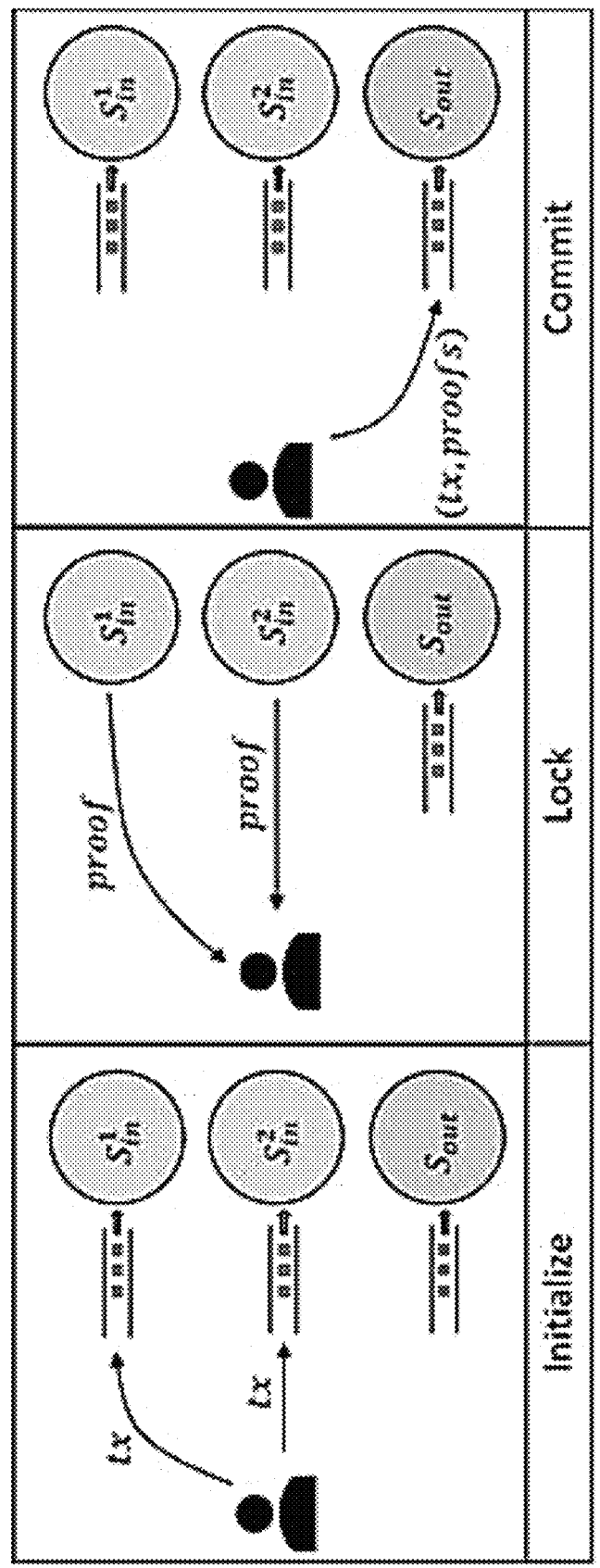
FIG. 1 is a diagram showing the steps for handling a cross-shard transaction in an OmniLedger protocol in accordance with the present disclosure.
Figure 2A:
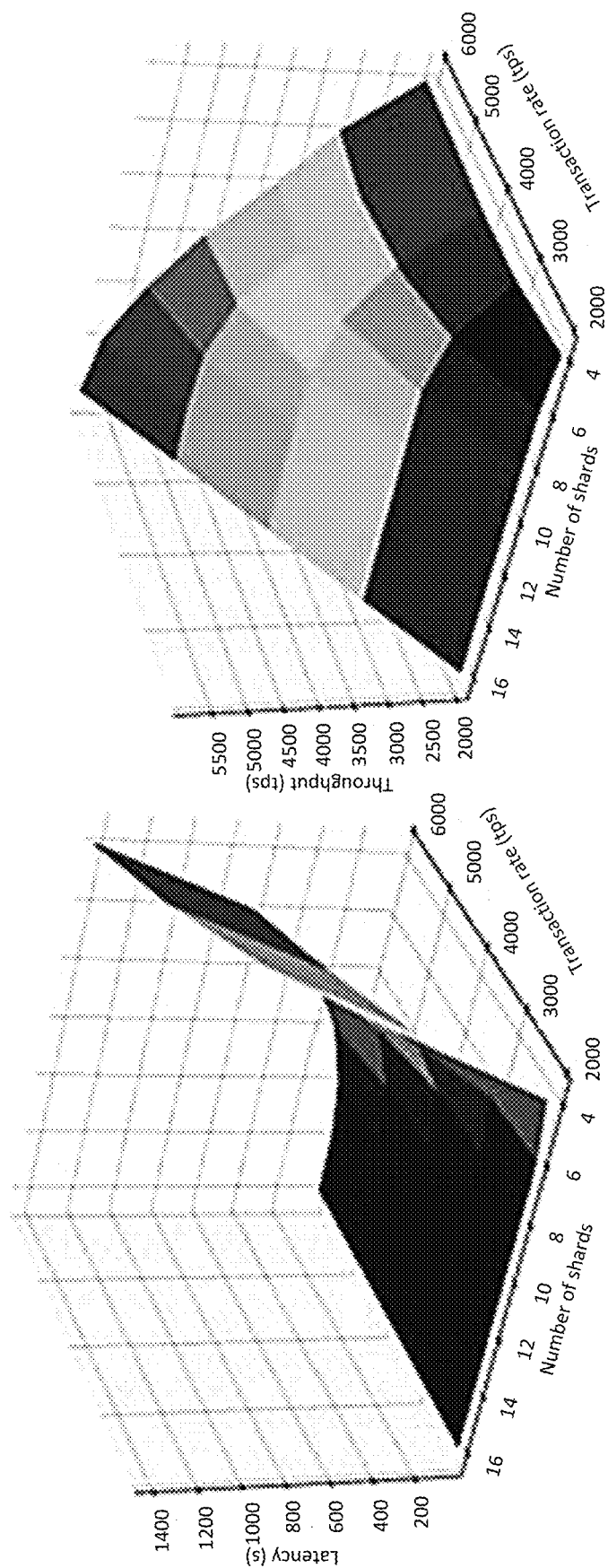
FIGS. 2A-2D show an impact of different transaction rates and number of shards on the latency and throughput of (A) an exemplary OptChain protocol in accordance with various embodiments of the present disclosure and conventional (B) OmniLedger, (C) METIS k-way, and (D) Greedy protocols in accordance with the present disclosure.
Figure 2B:
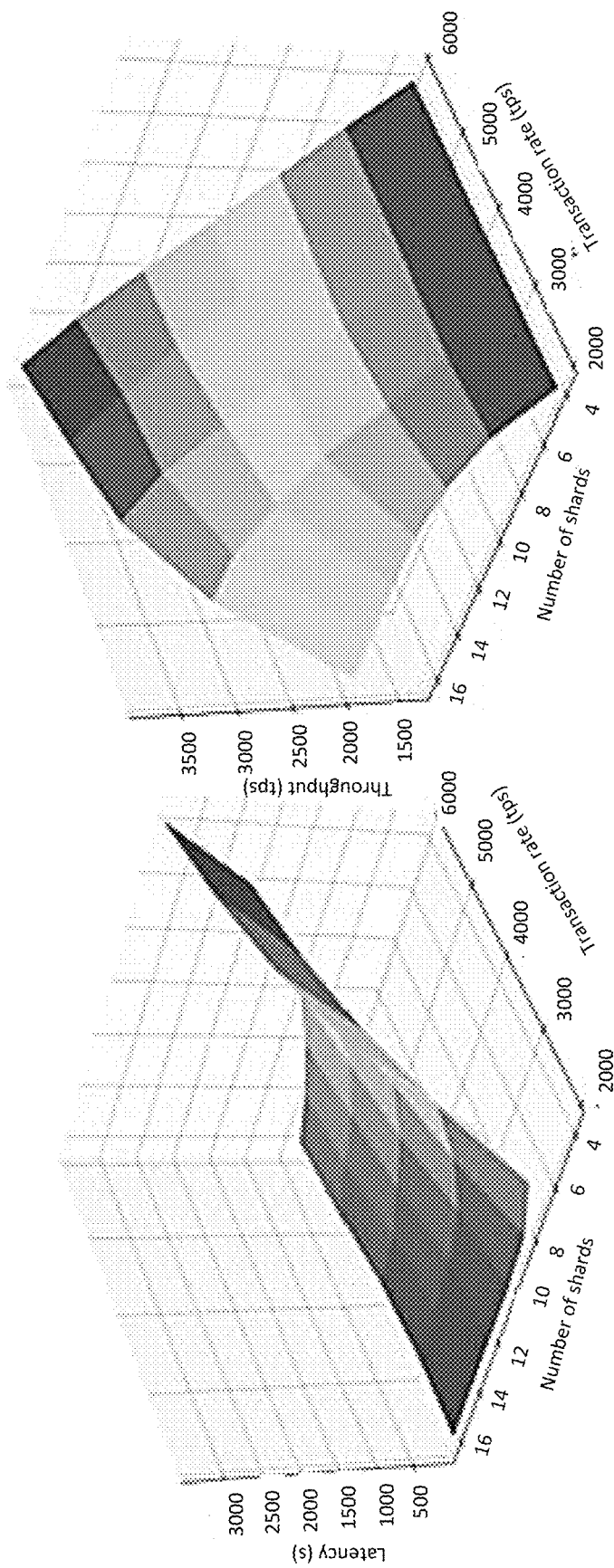
Figure 2C:
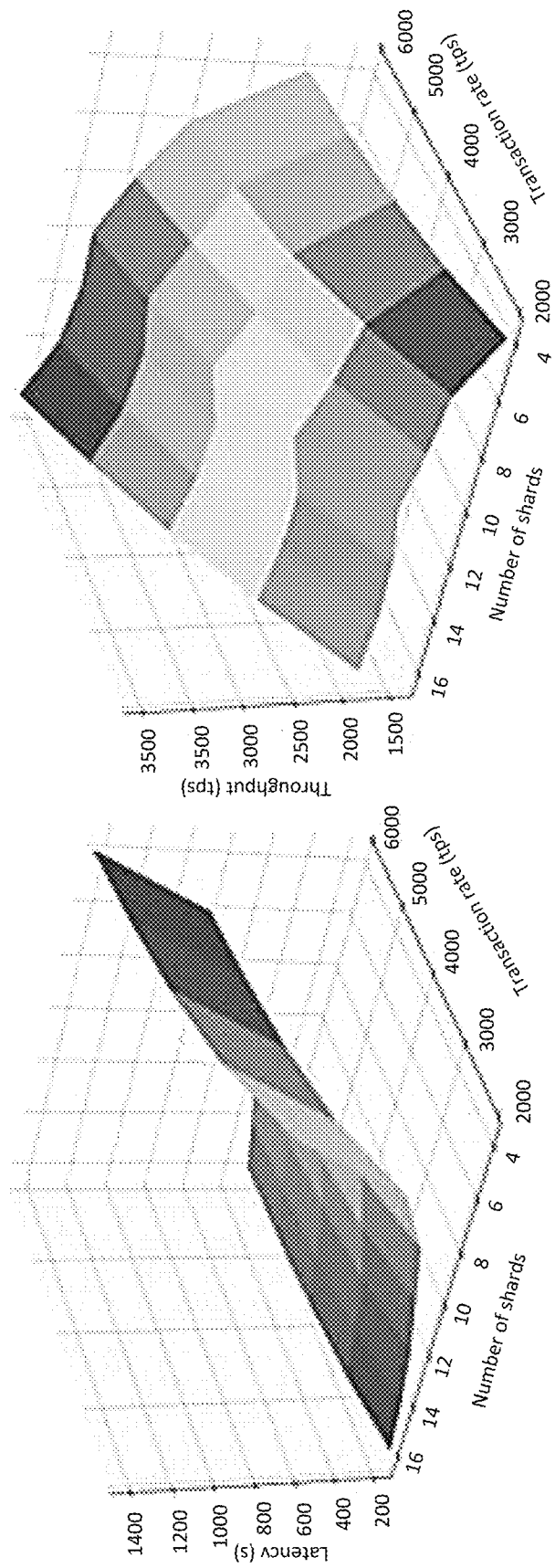
Figure 2D:
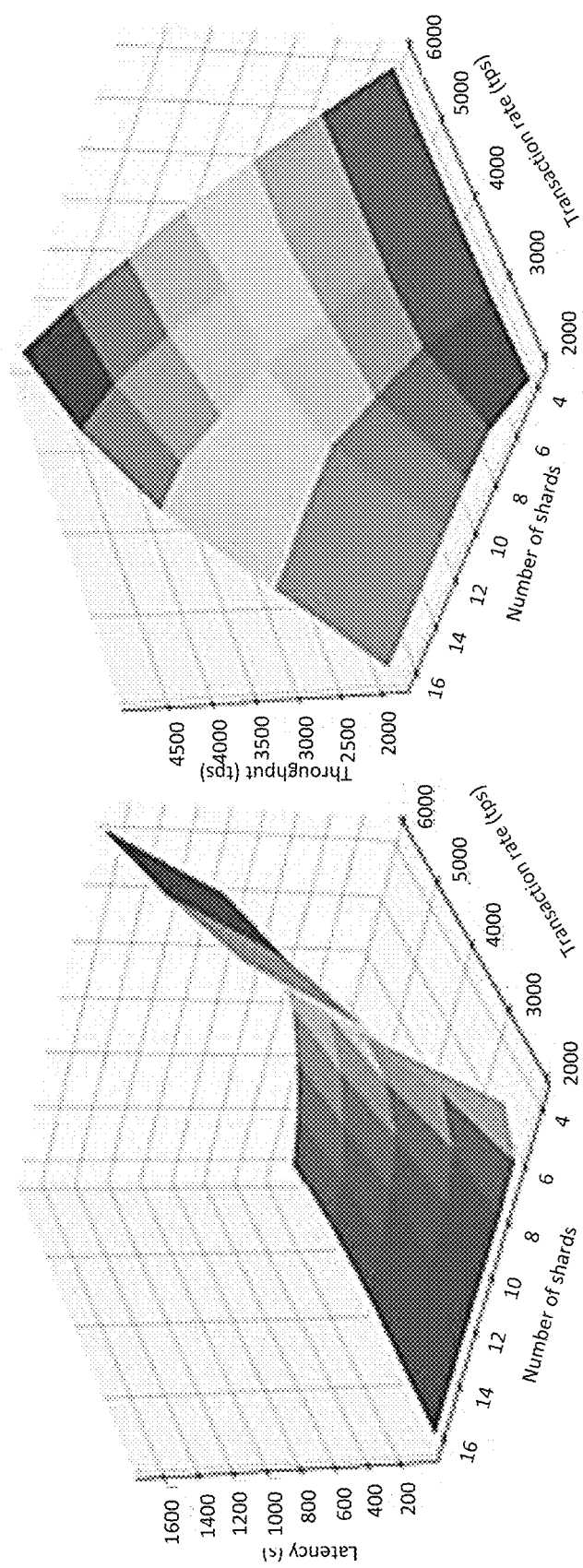

The present disclosure describes methods and systems that utilize a novel protocol, called OptChain, based on an original concept of transaction placement, which is able to group both related and soon-related transactions into the same shards, reducing the number of cross-shard transactions, while maintaining a temporal balance among shards to guarantee the high parallelism. In an exemplary embodiment, OptChain scales smoothly with transaction rate up to 20,000 transactions per second with 60 shards while guaranteeing confirmation time smaller than 8 seconds.

The present disclosure introduces the concept of smart transaction placement in order to scale the performance of the blockchain. Blockchain has emerged as a disruptive and transformational technology, with great potential and benefits, offering a promising new decentralized economy without the risk of single point of failures, monopoly, or censorship. Examples of these systems are ranging from cryptocurrency such as Bitcoin and Ethereum, to other infrastructures and application domains such as the Internet-of-Things, and Digital Health. Unfortunately, the performance level of existing decentralized systems based on the blockchain technology is too low to realize that vision, e.g., 7 transactions per second (tps) and up to 60 minutes confirmation time for Bitcoin and 10 tps/12 minutes for Ethereum.

To this end, blockchain sharding, which splits the blockchain into multiple disjoint parts, called shards, each maintained by a subgroup of nodes, has been previously proposed as a prominent solution for blockchain scaling. Since each node only needs to communicate with a few (hundreds) nodes from the same shard to maintain a small chunk of the blockchain, sharding reduces substantially the storage, computation, and communication costs. This is different from legacy blockchain systems, e.g., Bitcoin and Ethereum, in which all nodes need to communicate to maintain the same copy of the blockchain; thus, the performance is limited by the nodes' average processing capabilities. The latest sharding approaches, such as OmniLedger and RapidChain, can handle thousands of transactions per second with confirmation time about a few dozens of seconds.

All existing sharding approaches, however, face the same challenge of handling cross-shard transactions, which involve data from more than one shards. To prevent the double-spending problem, all shards that involve a cross-shard transaction (tx) need to execute multiple-phase protocols to confirm the transaction (tx). This can significantly increase both the latency and the effort to confirm the tx, comparing to the case when the tx need to be processed by only one shard. In turns, extra efforts in confirming txs may lead to higher tx fees. To make it even worse, more than 95% of the transactions are cross-shard. Previous sharding approaches often place txs into shards randomly to balance the load among the shards.

In accordance with various embodiments of the present disclosure, OptChain boosts the performance of existing (and future) sharding approaches by optimizing the placement of txs into shards. In one embodiment, OptChain learns a pattern from the past txs to determine the shard-location for incoming txs based on whether such placement (1) reduces the cross-shard txs and (2) load balance among the shards. Specifically, OptChain works on top an unexplored graph construction for transaction networks in an Unspent Transaction Outputs (UTXO) model, termed Transactions as Nodes (TaN), and introduces a new score, termed Temporal Fitness, to assess the suitability of placing an incoming transaction to each shard.

The TaN network is constructed by abstracting each transaction as a node u and connecting the node u with another node v is a directed edge (u, v) if tx u uses tx v as an input. In various embodiments, TaN is an online directed acyclic graph (DAG), in which nodes arrive one by one. This construction is different from existing abstractions of transaction networks in which transactions are abstracted as edges among the nodes made of addresses.

In accordance with the present disclosure, the Temporal Fitness score is composed of two component scores called Transaction-to-Shard (T2S) and Latency-to-Shard (L2S) scores. The T2S score between a transaction u and a shard $S_i$, measures the probability that a random walk from a node/tx u ends up at some node in $S_i$, i.e., hence, how likely the transaction should be placed into the shard. An advantage of the T2S is that it can be computed efficiently in an $O(k \cdot n)$ time for all nodes and an $O(k)$ amortized time for any new incoming node. The L2S score measures the expected delay or latency in placing the transaction to each shard. A combination of the two scores are used to guide transaction placement into the shard that maximizes the T2S-score and minimizes the L2S latency.

As computing the T2S score only requires the information on the input txs, it can be done efficiently at the user side by modifying the existing Simple Payment Verification protocol, e.g., users do not need to download the complete transaction history. Based on the latencies observed from the shard, wallet software at the user side can use OptChain to make the decision on which shard will process the tx. After measuring the performance of OptChain on existing Bitcoin transactions, the results indicate that OptChain can effectively reduce the cross-shard txs up to 90 percent, cut the txs confirmation time to less than 8 seconds, and at the same time, maintain the throughput up to 20,000 transactions per second with 60 shards and potentially handle higher throughput with more shards.

As previously discussed, in blockchain sharding, the entire state of the blockchain is split into partitions called shards that contain their own independent piece of state and transaction history. A key idea is to parallelize the available computation power, dividing the blockchain into several smaller shards where each of them processes a disjoint set of transactions. The three core components of existing sharding protocols are (1) a protocol to (randomly) assign nodes into shards to form shard committees; (2) an intra-shard consensus protocol to be executed by shard committees (often a Byzantine Fault-Tolerant (BFT) protocol but also can be a Nakamoto-like protocol); and (3) an atomic protocol for cross-shard transactions.

For the first component (that assigns nodes into shards to form shard committees), the existing Elastico blockchain protocol uses a randomness obtained from the last state of a Proof-of-Work (PoW) block by using the least-significant bits to determine the committees which coordinate with each other to process transactions. The OmniLedger blockchain protocol uses a bias-resistant random generation protocol that relies on a verifiable random function (VRF). The RapidChain blockchain uses hash inequality to construct a reference committee that executes a distributed random generation protocol to generate an unbiased random value. Further, RapidChain uses a Cuckoo rule to gradually reconfigure committees to defense against adaptive adversary.

For the second component (involving executing an intra-shard consensus protocol by shard committees), Elastico uses an implementation of a Practical Byzantine Fault Tolerance (PBFT) protocol, which may not scale well beyond a few hundreds of nodes. OmniLedger uses a variant of Byzcoin that leverages scalable collective signing for fast confirmation of transactions. RapidChain assumes a more favorable network setting and uses a synchronous BFT protocol.

For the third component (involving an atomic protocol for cross-shard transactions), Elastico broadcasts the blocks to all shards, thus, does not have cross-shard transactions. The atomic cross-shard protocols for OmniLedger and Rapid-Chain are built on top of ledgers using an Unspent Transaction Output (UTXO) model. The UTXO model was introduced in original Nakamoto protocol for Bitcoin. In this model, transactions may have multiple inputs and outputs, where a transaction output is assigned with credits and locked to a user's address and is referred to as a UTXO. The UTXOs may then be used as inputs of another transaction, and after this transaction is committed to a block, those UTXOs will be marked as spent and cannot be used again. For simplicity, the present disclosure considers a transaction tx with two inputs $tx_{in}^1$, $tx_{in}^2$ and a single output $tx_{out}$.

For illustration purposes, let $S_{in}^1$, $S_{in}^2$, and $S_{out}$ denote the shards that contain $tx_{in}^1$, $tx_{in}^2$, and $tx_{out}$ respectively. If all the shards $S_{in}^1$, $S_{in}^2$, and $S_{out}$ are the same, we have a same-shard transaction, otherwise the transaction is cross-shard (cross-TX). If transactions are placed into shards randomly, it can be shown that the probability for a typical transaction having two inputs and one output to be a cross-shard transaction is about 94%, assuming 4 shards, and 99.98%, assuming 16 shards.

OmniLedger previously proposed an atomic protocol to commit cross-TXs consistently among all shards, in which the protocol locks all input transactions at the input shards before committing the output transaction(s) to output shard(s), as discussed in the following steps and shown in FIG. 1. In the Initialize step, a user creates a cross-TX whose inputs spend UTXOs, e.g., $tx_{in}^1$, $tx_{in}^2$, from some input shards, e.g., $S_{in}^1$, $S_{in}^2$. The client gossips the cross-TX and it eventually reaches all input shards. In the Lock step, all input shards validate the transactions within its shard. If the transactions are valid, they are marked spent on the shard's ledger, and a proof-of-acceptance is gossiped; otherwise a proof-of-rejection is gossiped. In the Commit step, if all input shards gossip the proof-of-acceptance, the client can gossip an unlock-to-commit transactions that eventually reach all output shards. In turn, each output shard validates the transaction and includes it to its ledger. However, if even one input shard issued a proof-of-rejection, then the transaction cannot be committed and has to abort. The client then can gossip an unlock-to-abort message to reclaim the fund.

Alternatively, RapidChain uses a "yanking" mechanism, in which the input transactions, e.g., $tx_{in}^1$, $tx_{in}^2$, are first moved from the input shards, e.g., $S_{in}^1$, $S_{in}^2$, to the output shard, e.g., $S_{out}$, via an inter-committee protocol. After all the input transactions are successfully "yanked" to the output shard, then, the final transactions can be added to the ledger of the output shard.

Compared to same-shard transactions, cross-TX incurs a much higher confirmation time, communication costs, and computation costs. In OmniLedger, a cross-TX easily doubles the confirmation time of those in the same-shard transactions. For the same-shard transaction, the user only needs to submit the transaction to the shard and wait for confirmation. The confirmation time is the round time trip between the users and the shard plus the time for the shard committee to agree on the transactions. A cross-TX incurs extra time to confirm the input transactions as the input shards as well as another round time trip between the users and the shard committees. The same is applied for Rapid-Chain cross-TX protocol as each cross-TX incurs extra round-time trip among the committees as well as the waiting time for input transactions to agree on 'yanking' transactions between shards resulting in extra communication and computation costs. For a typical cross-TX with 2 inputs and one output, the communication cost is triple that of a same-shard transaction as all the three shard committees and the user need to communicate to confirm the transaction. The same holds for the computation cost. Thus, assuming uniform time and cost to handle transactions in shards, each cross-TX doubles the confirmation time, triples the bandwidth consumption, and computation cost. Therefore, if the fraction of cross-TXs can be reduced to 20%, the confirmation time will be cut by more than 40% and the throughput will be more than doubled.

In existing sharding approaches, transactions are placed randomly into shards, in which the hashed value of a transaction is often used to determine which shards the transaction will be placed into in order to balance the amount of transactions per shard, but also cause almost all transactions to be cross-TXs. For a typical transaction having two inputs and one output to be a cross-shard transaction is about 94%, assuming 4 shards, and 99.98%, assuming 16 shards. To be specific, the existing blockchain systems do not consider the relationship between transactions as part of the sharding process, which makes a majority of transactions eventually become cross-TXs.

Ideally, well-connected transactions should be grouped into a same shard. By that way, we can minimize the number of verification steps of cross-TX to obtain proof-of-acceptance. Moreover, the current state of shards should also be considered in order to avoid situations where some shards are extremely busy (e.g., have a huge number of transactions in queue to wait for verification) while some are idle. Intuitively, with a random selection, the number of transactions in each shard can be balanced. However, some transactions could take more time to be processed than the others. Therefore, simulation demonstrates that there are some moments where the random selection will eventually cause extremely imbalance on queue sizes between shards.

In accordance with the present disclosure, the relation between transactions is indicated using a graph representation while in a previous work (at D. Kondor, M. Posfai, I. Csabai, and G. Vattay, "Do the rich get richer? an empirical analysis of the bitcoin transaction network," PloS one, vol. 9, no. 2, p. e86197, 2014), Kondor et al. addressed the transactions network as a graph where each node represents a user address, and each directed edge between two nodes is created if there is at least one transaction between the corresponding addresses, embodiments of the present disclosure are fundamentally different in that transactions are represented as nodes while an edge between two nodes represents the behavior that one transaction spends an output of the other. By such representation, the problem of transaction sharding is modeled to be an online graph partitioning problem with temporal balancing, where nodes in a graph is divided into disjoint subsets and the objective is to identify which subset should contain a new arriving node. Online graph partitioning has been addressed in the literature. For example, Stanton et al. (at I. Stanton and G. Kliot, "Streaming graph partitioning for large distributed graphs," in Proceedings of the 18th ACM SIGKDD international conference on Knowledge discovery and data mining. ACM, 2012, pp. 1222-1230) and Abbas et al. (at Z. Abbas, V. Kalavri, P. Carbone, and V. Vlassov, "Streaming graph partitioning: an experimental study," Proceedings of the VLDB Endowment, vol. 11, no. 11, pp. 1590-1603, 2018) have proposed multiple natural, simple heuristics and compared their performance to Metis, a fast and offline method. The objective of their algorithms is to partition network vertices into almost equal disjoint sets while minimizing a number of crossing edges (such that an edge has two endpoints that are in two different sets). However, these works are fundamentally different to concepts of the present disclosure, in which the number of cross-shard transactions is minimized rather than crossing edges. Furthermore, while these earlier works eventually guarantee the balances between sets, the present disclosure is more concerned with temporal balancing, in which it is preferred that the number of vertices on each set should be almost equal for any given time.

An exemplary OptChain protocol, in various embodiments, can be built on top of a wallet software in a user side to determine the best shard for transaction submissions in order to minimize cross-TXs with the temporal balance, thereby, shortening the confirmation time and boost the overall system throughput. Notably, OptChain does not require users to store the whole blockchain to optimize the placement. Specifically, via the smart transactions placement in OptChain, the following goals can be met: (1) Fast Confirmation Time—As major txs are same-shard txs and load are distributed evenly and txs get confirmed in much shorter time; (2) High Throughput—Same-shard txs require less time and communication to confirm; thus, the system throughput gets significantly boosted; and (3) Low Fee—As the effort spent per tx reduces, the nodes in the network can charge users lower transactions fee while still staying profitable.

The above goals are obtained via optimizing the following two indirect goals: (1) Cross-TX Minimization—Reduce the number of cross-shard transactions by grouping related transactions into a same shard; and (2) Temporal Balancing—To distribute load evenly among shards to increase parallelism and reduce queuing time. To realize such goals, a system model is presented, in which transactions are represented under a directed network. Under this model, a T2S-score is used to measure how likely a transaction should be placed into the shard. Then, an L2S score is determined via a mathematical model that estimates confirmation latency for placing a transaction into shards. Finally, an exemplary OptChain protocol places transactions into shards based on the combination of T2S and L2S scores.

In accordance with various embodiments of the present disclosure, a set of transactions are modeled under a graph representation to observe the relation between transactions, in which the model is referred to as a Transactions as Nodes (TaN) network. In various embodiments, the TaN network of a set of transactions is presented as a directed graph $G=(V,E)$ where V is the set of transactions and E is a set of directed edges in which there exists $(u, v) \in E$ if the transaction u uses the UTXO(s) of transaction v.

Since a transaction only uses UTXO(s) of past transactions, a TaN network is a directed acyclic graph and can be sorted in a topological order, which exactly reflects the order of appearance of transactions. By distributing transactions into shards, the task of transaction sharding eventually involves partitioning the TaN network into set of k disjoin subsets $S=\{S_1, \ldots, S_k\}$ of nodes, where k is the number of shards and $S_i$ denotes a set of transactions under management of shard i for which we have $U_{i=1}^k S_i = V$ and $S_i \cap S_j = 0$ for all i, $j=1 \to k$.

Given a transaction represented by node $u \in V$, $S(u) \in S$ is denoted as a shard containing u. If we let $S_{in}(u)$ be denoted as a set of input shards of u, then u is a cross-TX if and only if $S_{in}(u) \neq \{S(u)\}$. Therefore, the task of distributing a new transaction into shards is considered as an online partitioning to the TaN network. To be specific, given a TaN network $G=(V,E)$, a set of k disjoint subset of nodes $S=\{S_1, S_2, \ldots, S_k\}$ and a new arrival transaction (node) u, the task is to identify $S(u) \in S$.

To do so, a metric is presented to measure a fitness score between the new arrival transaction and shards, which we called Transaction-to-Shard (T2S) score. In one embodiment, this score is formed using a graph measurement, called PageRank, in one embodiment. To be specific, PageRank assigns numerical weighting to each node of a network with the purpose of measuring node relative importance within the network, in which a PageRank vector is a weighted sum of the probability distribution obtained by taking a sequence of random walk steps starting from a specified initial distribution. PageRank has been proven to be an efficient method on graph local partitioning, in which nodes in a same set of partition tend to have a similar weight.

Although regular PageRank computation could cost considerable runtime, embodiments of the present disclosure utilize the trait that TaN is acyclic and the order of a node's appearance is also TaN's topological order to devise a fast T2S-score computation of each node. To be specific, the present disclosure represents the T2S-scores of a transaction u to shards under a k-dimensional vector p(u), in which the entry i measures the fitness between u and shard i. If we denote r[i] as the value of entry i of vector r and let $N_{in}(u)$ ($N_{out}(u)$) be denoted as a set of input (output) transactions of u, p(u) is computed by the following equation:

$$p(u) = \alpha s(u) + (1-\alpha) \sum_{v \in N_{in}(u)} \frac{p(v)}{|N_{out}(v)|}$$

where $\alpha$ is a constant in (0, 1] and s(u) is a starting vector for a node u. s(u) is initiated as follows:

If u is a new arriving node, $s(u)=\{0\}^k$.

Otherwise, s(u) receives a value $$\frac{1}{|S(u)|}$$

at the entry corresponding to shard S(u) and 0 elsewhere.

Clearly p(u) can easily be calculated in the manner similar to Bread-First Search, in which we start from nodes who have no input (coinbase transaction). Therefore, computing p(u) for all $u \in V$ costs $O(k(|V|+|E|))$ runtime complexity, which is very expensive as the TaN network grows. However, it is observed that after placing a new transaction u into shard S(u), the change on s(v) for all $v \in V$ does not impact the fitness score of all nodes other than the normalization scale. To be specific, if we assume at time t+1, u arrives and is placed into shard i $(S(u)=S_i)$ and if we denote $p^{(t)}(v)$ is the T2S-score vector of node v at time t and $S_i^{(t)}$ is the shard i at time t, we have:

If $v \neq u$, $$p^{(t+1)}(v)[i] = \frac{|S_i^{(t)}|}{|S_i^{(t)}|+1} p^{(t)}(v)[i]$$

and $$p^{(t+1)}(v)[j] = p^{(t)}(v)[j] \text{ for all } j \neq i.$$

If $v = u$, $p^{(t+1)}(v)[i] = \alpha \frac{1}{|S_i^{(t)}|+1} + \frac{S_i^{(t)}}{S_i^{(t)}+1} p^{(t)}(v)[i]$ and $$p^{(t+1)}(v)[j] = p^{(t)}(v)[j] \text{ for all } j \neq i.$$

Therefore, rather than computing p(v) for all $v \in V$ from scratch to get a T2S score of a new transaction u, the present disclosure presents the following methods for a faster calculation. First, the present disclosure introduces two other vectors p'(v), s'(v) associated to each node $v \in V$ in addition to s(v) and p(v). Accordingly, if a transaction v is placed in shard j then s'(v)[j]=1 and s'(v)[i]=0 for all $i \neq j$; s'(v) is fixed right after v is placed. Given a new transaction u, p(u) can be computed as follows:

If u is a coinbase transaction, there is no calculation needed.

Otherwise, we set $$p'(u) = (1-\alpha) \sum_{v \in N_{in}(u)} \frac{p'(v)}{|N_{out}(v)|}.$$

The T2S score of node u is $$p(u) = \left\{ \frac{p'(u)[i]}{\sum_v s'(v)[i]} \right\}_i^k.$$

Then, after placing u into shard i (S(u)=Si), we update $p'(u)=p'(u)+\alpha s'(u)$. Overall, the computation of p(u) now only costs $O(|N_{in}(u)|k)$.

As a point of discussion, one may ask why the new T2S score is developed instead of using existing graph partitioning methods to minimize the number of cross-TXs. To minimize the number of cross-TXs, the best (although unrealistic) way is to know the structure of the TaN network beforehand (i.e. all transactions have arrived) and apply graph partitioning algorithms. However, even under this scenario, the performance of sharding blockchain may not be improved. To illustrate, during experimental analysis, a well-known graph partitioning tool, called Metis k-way, was applied to get the partitioning on transactions. However, during simulations, if we put transactions exactly like in the Metis solution, a blockchain system's throughput and confirmation latency are highly impacted as the Metis solution tends to put large amount of consecutive transactions into one shard.

A more realistic and simplistic method is the preexisting Greedy algorithm. In this method, $S_i^{(t)}$ is denoted as a set of transactions in shard i at time t considering a transaction u arrives at a moment t. The Greedy algorithm computes the cost of placing u on shard j as $f(u, j)=|S_{in}(u)\setminus S_j^{(t)}|$ and places u into shard $\operatorname{argmin}_j f(u, j)$. While, intuitively, the Greedy solution will help reduce the number of cross-TXs, this solution does not take the global view on the TaN network structure and only considers a connection of one-hop away from u. Thus, in the long term, the performance of the Greedy algorithm becomes undesirable.

To prove the efficiency of the T2S-score, the percentage of cross-TXs between OmniLedger, Greedy solution, and an exemplary T2S-based solution is compared. For the T2S-based solution, after computing p(u), u is placed into a shard with the highest T2S-score, i.e. $\operatorname{argmax}_i p(u)[i]$). For experimental trials, the algorithms are executed from scratch, where all shards are empty at the beginning, and the results are presented in Table I (below) showing the percentage of cross-TXs when running from scratch. The results show that the T2S-based solution significantly reduces the number of cross-TXs and overcomes Greedy solution with a huge margin. Although the Metis solution is unrealistic, its results are shown in the table as a baseline for comparison.

TABLE I

| k  | Metis | Greedy | Omniledger | T2S-based |
|----|-------|--------|------------|-----------|
| 4  | 1.66% | 24.62% | 80.82%     | 9.28%     |
| 8  | 3.09% | 27.02% | 90.33%     | 12.52%    |
| 16 | 4.70% | 28.14% | 94.87%     | 15.73%    |
| 32 | 6.91% | 28.69% | 97.09%     | 18.94%    |
| 64 | 9.91% | 28.97% | 98.18%     | 21.65%    |

Next, we consider at a certain moment that the blockchain system places a certain amount of transactions into shards. Then, the algorithms with a set of new arrival transactions are applied and the number of cross-TXs compared. To be specific, Metis is first used to partition the TaN network of 30 millions Bitcoin transactions into k shards. Afterwards, an algorithm is applied to place transactions of a sequence of next 1 million transactions into k shards. The results are presented in Table II (below) showing the number of cross-TXs under the various algorithms. Again, the T2S-based solution showed its improved efficiency compared with Greedy and OmniLedger in term of minimizing the number of cross-TXs.

TABLE II

| k  | Greedy  | Omniledger | T2S-based |
|----|---------|------------|-----------|
| 4  | 335,269 | 837,356    | 112,657   |
| 8  | 407,747 | 922,073    | 172,978   |
| 16 | 441,267 | 960,935    | 226,171   |
| 32 | 449,032 | 979,323    | 282,108   |
| 64 | 454,321 | 988,144    | 366,854   |

The analysis shows that a simple solution using a T2S-score can significantly reduce the number of cross-TXs. However, this may not be the best solution. For example, if there is a huge amount of transactions arriving sequentially with the same "fittest" shard with respect to the T2S-score, putting all those transactions into the same shard is not a good solution. Therefore, various embodiments of the present disclosure utilize an estimated Latency-to-Shard (L2S) score that estimates confirmation latency of a transaction under transaction sharding. Hence, in accordance with various embodiments of the present disclosure, the best transaction placement is the one that maximizes the T2S-score while minimizing the L2S-score.

To illustrate, let's denote system shards as $S_1, \ldots, S_k$ and consider a moment a new transaction u arrives. Assume if u is placed in shard j, u will need a proof-of-acceptance from a set of shards $S_j$. One can model the communication time between a user who creates u and the shard $S_i$ under exponential distribution $1_c^{(i)} = \lambda_c^{(i)} e^{-\lambda_c^{(i)} t}$, where $$\frac{1}{\lambda_c^{(i)}}$$

represents an expected communication time, which can be collected through frequent sampling between the user and shard $S_i$. Also, for each shard $S_i$, the verification time of $S_i$ can be modeled under exponential distribution $1_v^{(i)} = \lambda_v^{(i)} e^{-\lambda_v^{(i)} t}$, where $$\frac{1}{\lambda_v^{(i)}}$$

represents an expected verification time, which can be estimated from an observation of a recent consensus time of shard i and its current queue size. With high precision, it is likely that $\lambda_v^{(i)} \neq \ldots \neq \lambda_v^{(k)} \neq \lambda_c^{(1)} \neq \ldots \neq \lambda_c^{(k)}$.

Therefore, a probability distributed function of time to receive or get a proof-of-acceptance from shard $S_i$ can be modeled as follows:

$$f^{(i)}(t) = \int_0^t l_c^{(i)}(x) l_v^{(i)}(t-x) \Delta x$$

$$= \frac{\lambda_c^{(i)} \lambda_v^{(i)}}{\lambda_v^{(i)} - \lambda_c^{(i)}} \left( e^{-\lambda_c^{(i)} t} - e^{-\lambda_v^{(i)} t} \right)$$

while the cumulative distributed function can be represented as:

$$F^{(i)}(t < T) = \int_0^T \frac{\lambda_c^{(i)} \lambda_v^{(i)}}{\lambda_v^{(i)} - \lambda_c^{(i)}} \left( e^{-\lambda_c^{(i)} t} - e^{-\lambda_v^{(i)} t} \right) \Delta t$$

$$= \frac{\lambda_v^{(i)}}{\lambda_v^{(i)} - \lambda_c^{(i)}} \left( 1 - e^{-\lambda_c^{(i)} T} \right) - \frac{\lambda_c^{(i)}}{\lambda_v^{(i)} - \lambda_c^{(i)}} \left( 1 - e^{-\lambda_v^{(i)} T} \right)$$

As the user can send a request for verification simultaneously to shards in $S_j$, the probability that a verification process is done by time T can be computed as:

$$F(t < T) = \prod_{S_i \in S_j} F^{(i)}(t < T)$$

Thus, the probability distributed function of time for the user to get all proof-of-acceptances if u is placed into shard j can be modeled as follows:

$$f_v^{(j)}(t) = \frac{\Delta F(t)}{\Delta t}$$

$$= \sum_{S_i \in S_j} \frac{\lambda_c^{(i)} \lambda_v^{(i)}}{\lambda_v^{(i)} - \lambda_c^{(i)}} \left( e^{-\lambda_c^{(i)} t} - e^{-\lambda_v^{(i)} t} \right) \prod_{S_r \in S_j \setminus S_i} F^{(r)}(t)$$

Similarly, we can find the probability distribution for u to get confirmation from shard j as:

$$f_c^{(j)}(t) = \frac{\lambda_c^{(j)} \lambda_v^{(j)}}{\lambda_v^{(j)} - \lambda_c^{(j)}} \left( e^{-\lambda_c^{(j)} t} - e^{-\lambda_v^{(j)} t} \right)$$

Therefore, the L2S-score of u being placed into shard j can be computed as:

$\varepsilon(j) = \int_0^\infty t \int_0^t f_v^{(j)}(\chi) f_v^{(j)}(t-\chi) \Delta\chi \Delta t$ In overall, for a given transaction, we would like to balance between the T2S and L2S-score. Specifically, given a new arrived transaction u and a shard j, the Temporal Fitness score between u and j is defined as $$\frac{p(u)[j]}{\varepsilon(j)}.$$

An exemplary OptChain protocol places u into the shard that has the highest Temporal Fitness score. An exemplary procedure of transaction sharding in OptChain is presented by Algorithm 1 (below), in accordance with various embodiments of the present disclosure.

---

Algorithm 1 Transaction Sharding in OptChain

Input: G(V, E), $S_1, \ldots S_k$, p' : V → $\mathbb{R}^+$, α and a new transaction u
Output: a new state of $S_1, \ldots S_k$
  1: # Compute T2S-scores of u 2:
$$p'(u) = (1 - \alpha) \sum_{v \in N_{in}(u)} \frac{p'(v)}{[N_{out}(v)]}$$

3:
$$p(u) = \left\{ \frac{p'(u)[i]}{[S_i]} \right\}_{i=1}^k$$

4: # Compute L2S-scores of u
  5: for j = 1 → k do
  6:    $\varepsilon(j) = \int_0^\infty t \int_0^t f_v^{(j)}(x) f_v^{(j)}(x)(t-x) \Delta x \Delta t$
  7: end for
  8: # Put u into shard with the highest Temporal Fitness score
  9: $s_u = \text{argmax}_i p(u)[i]/\varepsilon(i)$
10: $S_{s_u} \leftarrow S_{s_u} \cup \{u\}$
11: # Update after placing u into $S_{s_u}$
12: $p'(u)[s_u] = p'(u)[s_u] + \alpha$
13: Return $S_1, \ldots S_k$

---

To evaluate the impact of an exemplary OptChain protocol on a blockchain system's latency and throughput, the performance of an exemplary OptChain protocol was rigorously compared to OmniLedger, Metis, and the Greedy heuristic to demonstrate the strengths of an exemplary procedure of transaction sharding. As opposed to OmniLedger, an experimental dataset was utilized that had a greater chance of creating cross-TXs. In particular, previous experiments for OmniLedger (as described in E. Kokoris-Kogias, P. Jovanovic, L. Gasser, N. Gailly, and B. Ford, "OmniLedger: A secure, scale-out, decentralized ledger," IACR Cryptology ePrint Archive, vol. 2017, p. 406, 2017) used the first, arguably simple, 10,000 Bitcoin blocks which contain only 10,093 transactions in total. Additionally, of those transactions, 99.1% are coinbase, which cannot be cross-TXs. At that point in time, Bitcoin was still in an initial phase in which there was only about 1 transaction per block and most of them were coinbase transactions. Therefore, their experimental results do not represent the impact of cross-TXs. Thus, for the present disclosure, experiments are conducted on the first 10 million Bitcoin transactions, taken from the dataset reported in "Bitcoin network dataset," https://senseable2015-6.mit.edu/bitcoin/, 2018, accessed: 2019-01-12. From this dataset, a TaN network was built that contained 10,000,000 vertices and 19,958,051 edges. As opposed to OmniLedger, this dataset is much bigger with more chance of creating cross-TXs. Specifically, with 16 shards, the OmniLedger's random placement produces 9,349,979 cross-TXs comprising 93.5% of the whole set.

Accordingly, for experimental analysis, a sharding-based blockchain simulation was developed and used to run the transaction placement algorithms to calculate the latency and throughput. Particularly, the OverSim framework was used to simulate a Bitcoin-like blockchain system on OMNeT++4.6, which is a discrete event-based network simulator. The bandwidth of all connections between nodes was set to 20 Mbps and a latency of 100 ms was imposed on all communication links. The block size of 1MB was set because it is currently the block size limit in Bitcoin. Since the average size of a transaction is about 500 bytes, about 2000 transactions are placed in one block, in which a shard was assigned with about 400 validators and one leader that were randomly placed at different coordinates. In an exemplary simulation, the distance between nodes affects the communication latency. Thus, each shard implements a queue (or mempool) to store incoming transactions that have not been processed. The exemplary simulation involves a set of clients that continuously issue transactions from the dataset to the blockchain system at a predefined rate. Before sending a transaction u for verification, a client will run a transaction placement algorithm to determine the shard S(u) in which to place that transaction.

In the OmniLedger protocol, users gossip each transaction to all nodes in the network; thus, all nodes must receive the whole blockchain (and also the unconfirmed transactions, if any). Thus, even when the number of nodes and shards go to infinity, the throughput of nodes in OmniLedger is still limited by a typical network bandwidth of the nodes. To address this issue, users will direct the each transaction directly to the input shards and output shards of the transaction.

Next, the transaction placement strategy for an exemplary OptChain protocol is compared with three existing transaction placement methods: OmniLedger that utilizes a default random placement strategy; Greedy placement strategy; and Metis partitioning algorithm to partition the network into k shards. As Metis k-way is an offline algorithm, it is not a realistic transaction sharding scheme. However, if transactions are placed in accordance with the Metis solution, the number of cross-TXs can be minimized. Therefore, it is studied whether only minimizing the number of cross-TXs can improve the blockchain system performance. Therefore, for experimental purposes, the whole TaN network is input to get its Metis solution and then the resulting partitions are used to determine S(u) for each transaction u. The foregoing experiments were carried out with various configurations by combining a different number of shards and transaction rates. Specifically, the number of shards were varied from 4 to 16 to conform with the previous experiments reported for OmniLedger (as described in E. Kokoris-Kogias, P. Jovanovic, L. Gasser, N. Gailly, and B. Ford, "OmniLedger: A secure, scale-out, decentralized ledger." *IACR Cryptology ePrint Archive*, vol. 2017, p. 406, 2017).

With regard to the transaction rate (the rate at which transactions are sent to the blockchain system), the VISA-level throughput of 4000 transactions per second (tps) was referenced and used to set the transaction rate from 2000 tps to 6000 tps. Table III (below) summarizes all the parameters and configuration of the experiments.

TABLE III

| | |
|---|---|
| Number of transactions | 10,000,000 |
| Block size | 1 MB |
| Transactions per block | 2,000 |
| Network bandwidth | 20 Mbps |
| Number of shards | 4, 6, 8, 10, 12, 14, 16 |
| Transactions rate (tps) | 2000, 3000, 4000, 5000, 6000 |
| Algorithms | OptChain, Metis k-way, OmniLedger, Greedy |

In FIGS. 2A-2D, a blockchain system's average latency and throughput are summarized when running the various algorithms with different combinations of transaction rates and number of shards. The throughput is calculated by taking the number of transactions divided by the total time for all transactions to get committed. The latency of a transaction is measured by the time from when the transaction is sent to when the transaction is committed to the blockchain. Insight on how different configurations impact the performance of OptChain as well as other transaction sharding methods in term of throughput and latency is explored in the figures.

From FIGS. 2A-2D, it is easy to see that all the methods/ protocols achieve their highest throughput at a transaction rate of 6000 and 16 shards. However, except for OptChain, the other three algorithms produce throughput at a much lower rate than the input rate, which shows that these three algorithms are incapable of tolerating such a transaction rate in this setting. It is observed that even OptChain does not always run well in all configurations, e.g., throughput is lower than the transaction rate. But for each value of transaction rates, OptChain always has a certain configuration on the number of shards guaranteeing no backlogging in the system. To be specific, with a transaction rate of 2000, OptChain is totally healthy with at least 6 shards. This number in transaction rates of 3000, 4000, 5000, 6000 is 8, 10, 14, 16 respectively. Meanwhile, the OmniLedger system needs at least 16 shards to be able to process up to 3000 transactions per second. With 16 shards, Greedy is only able to process with a transaction rate up to 5000. Therefore, given a same transaction rate, OptChain needs a lower number of shards than other methods to avoid backlogging in the system.

Figure 3A:
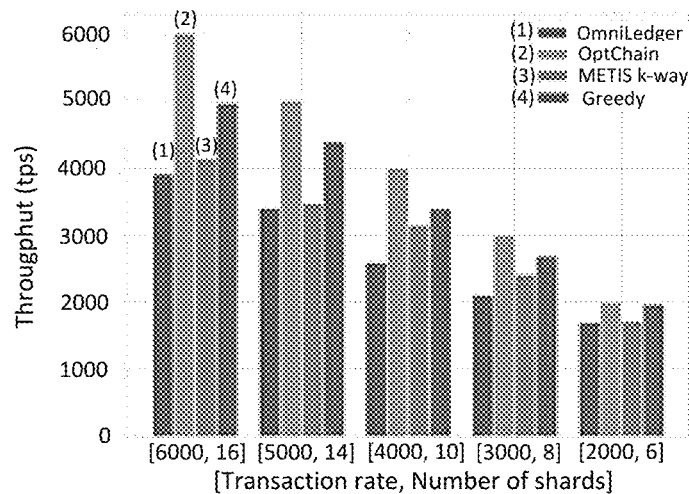
FIGS. 3A-3B show a blockchain system throughput for (A) varying transaction rate and number of shards and (B) the number of shards fixed at 16 in accordance with the present disclosure.

For a more comprehensive comparison, FIG. 3A presents the maximum system throughput at different pairs of values of the transaction rate and number of shards. As can be seen, no other transaction sharding methods can reach up to the same level as OptChain. For example, the maximum throughput OptChain can achieve at 16 shards is 52.2%, 43.9%, and 19.9% higher than that of OmniLedger, Metis, and Greedy, respectively.

Figure 3B:
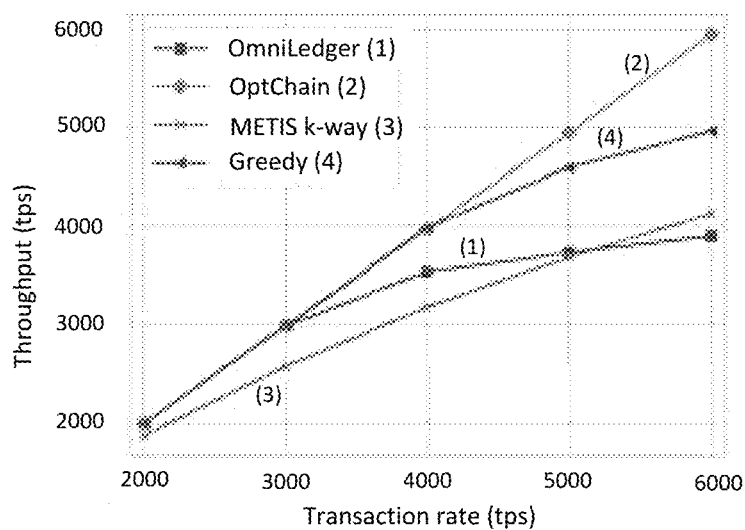

Metis has been proven to be the best method (yet unrealistic) to distribute transactions into shards in order to minimize the number of cross-TXs. The high number of cross-TXs is claimed by OmniLedger to be the main factor limiting the system performance. However, transactions are placed as in Metis's solution, the throughput is never inline with the transaction rate. For example, FIG. 3B shows the throughput of the algorithms as the number of shards is fixed to 16 and the transaction rates are varied. As previously stated, OptChain, OmniLedger, and Greedy are comfortable to a certain rate within such a range. However, Metis's throughput never reaches the transaction rate. Thus, one can conclude that a high number of cross-TXs is not a sole factor hindering a blockchain sharding performance.

Figure 4:
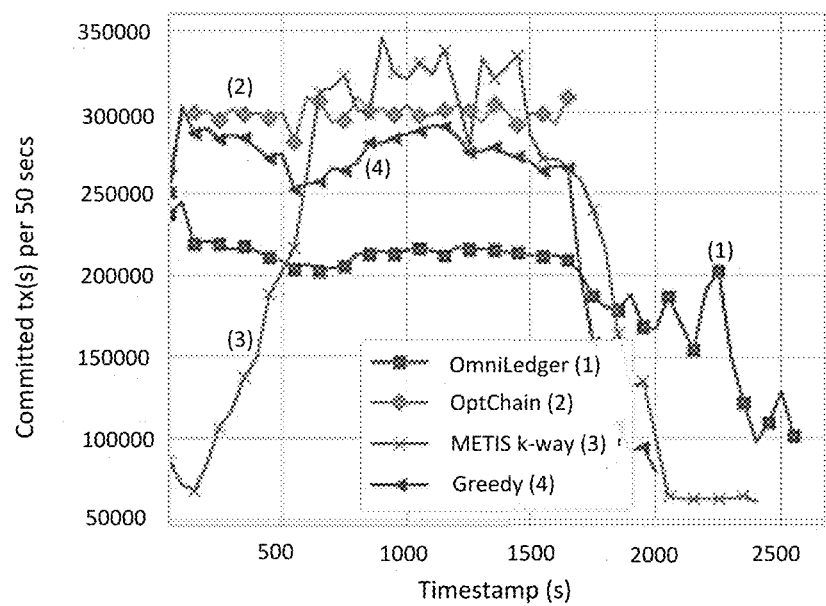
FIG. 4 shows a number of committed transactions across time of an exemplary OptChain protocol in accordance with various embodiments of the present disclosure and conventional OmniLedger, METIS k-way, and Greedy protocols in accordance with the present disclosure.
Figure 5A:
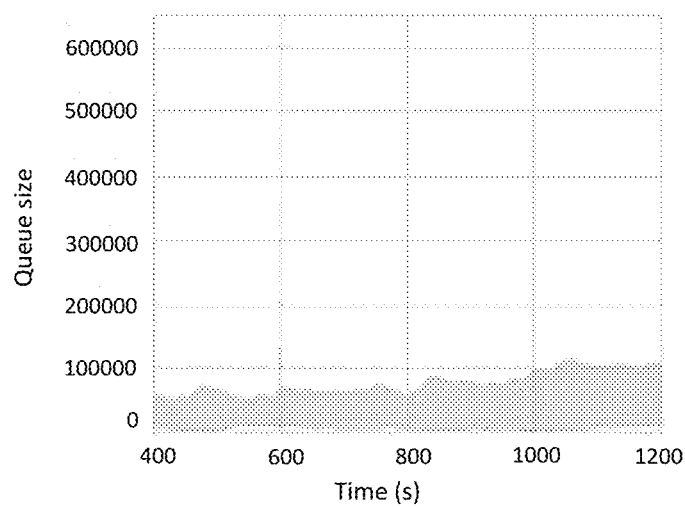
FIGS. 5A-5D shows maximum and minimum queue size of shards over time for (A) an exemplary OptChain protocol in accordance with various embodiments of the present disclosure and conventional (B) OmniLedger, (C) Greedy, and (D) Metis k-way protocols in accordance with the present disclosure.
Figure 5B:
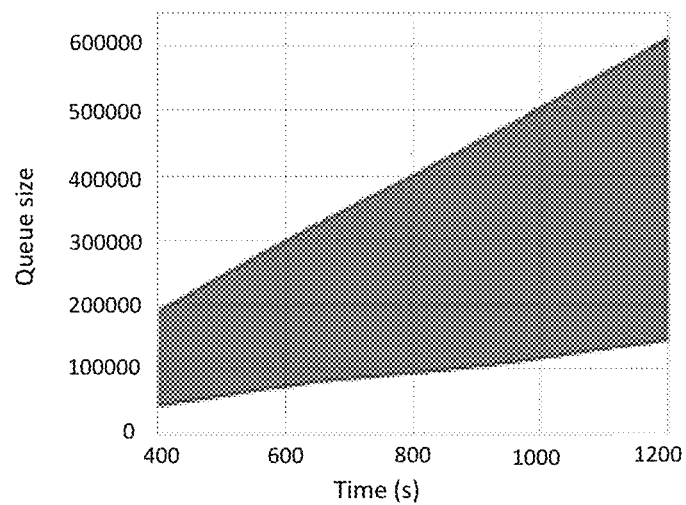
Figure 5C:
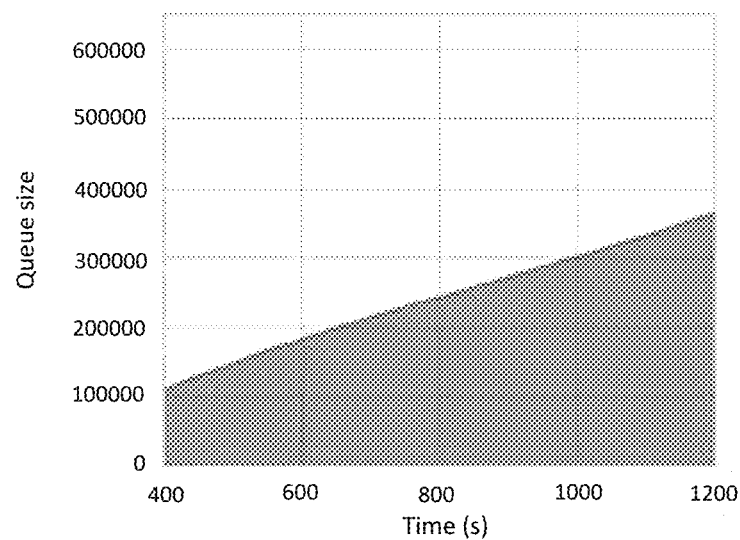
Figure 5D:
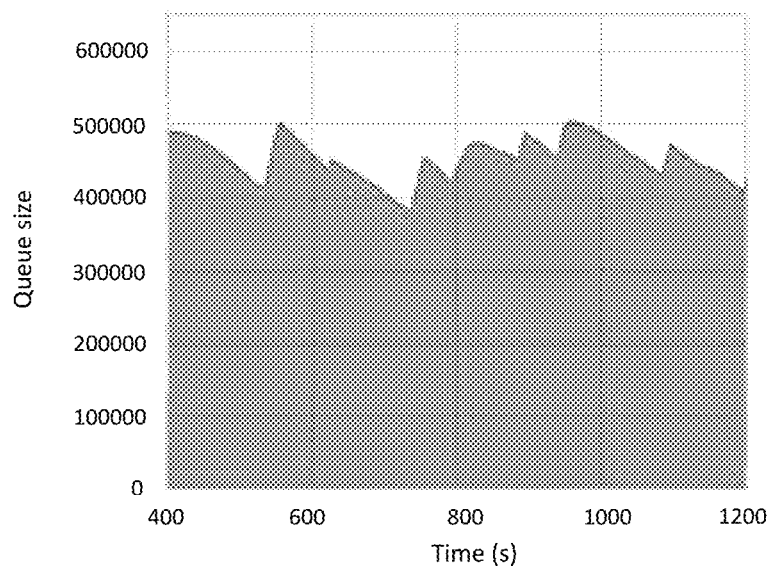

To explore what causes Metis's throughput being worse than other three solutions, insights on the time period before transactions are finally committed are studied. Accordingly, the transaction rate is set to 6000 and 16 shards, and the number of transactions getting committed in each 50-seconds period is counted. FIG. 4 shows a plotting of the results. In the figure, it is easy to see that OptChain, OmniLedger, and Greedy produce almost consistent number of committed transactions over each period of 50 seconds. Meanwhile, Metis is not efficient during the first 500 seconds. Also, Metis tends to agitate more than the other three solutions, which could imply congestion on shards in some certain moments, e.g., some shards get more transactions than the other. The huge drop in the end of each line in FIG. 4 is because the simulator has reached the end of the dataset in which no more transactions are sent to the system.

To observe the congestion, the change on queue sizes of shards is plotted under four sharding methods as shown in FIGS. 5A-5D. The congestion on Metis method is from the fact that Metis tends to put a large amount of consecutive transactions into one same shard. Thus, the pattern in which some shards are overwhelmed, while the others have no transactions, happens frequently in Metis. Greedy also met a situation that some shards have no transactions in several moments, but overall, transactions are split more equally in Greedy than Metis among remaining shards. Such an event does not happen in OptChain and OmniLedger. However, as OmniLedger is not capable of running with a transaction rate of 6000 tps, a shard's queue size will increase linearly overtime. OptChain performs the best in term of load balancing among shards. One can see that both the maximum and minimum queue size in OptChain are consistent and stable. Also, in worst case, a queue size in OptChain only reaches up to ≈100,000 transactions while transaction numbers in Metis, Greedy, and OmniLedger are 500000, 370000, and 610000 respectively.

Figure 6:
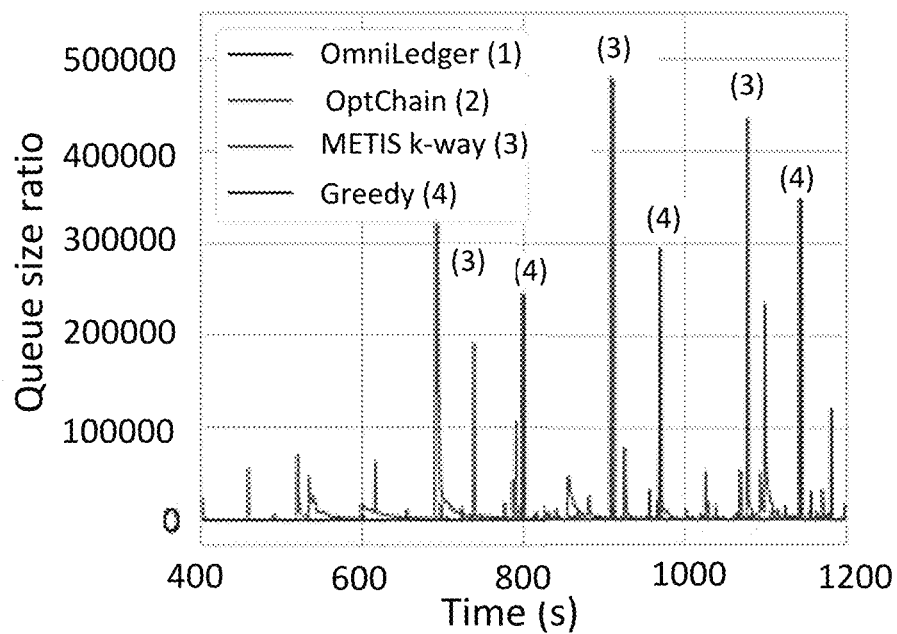
FIG. 6 shows a queue size ratio over time of an exemplary OptChain protocol in accordance with various embodiments of the present disclosure and conventional OmniLedger, METIS k-way, and Greedy protocols in accordance with the present disclosure.

To have a clearer observation of this behavior, the ratio is calculated between the maximum and minimum queue size of each algorithm at each simulation timestamp and compared in FIG. 6, where we can clearly see how inefficient the Metis and Greedy are in terms of temporal balance. Being unable to handle the load balancing among shards not only affects the throughput negatively but also notably increases the system's average latency as one shall see in the following experiments.

Next, the average (maximum) transaction latency, i.e., transaction confirmation time, is compared among the different sharding approaches. As demonstrated in FIGS. 2A-2D, all four sharding methods share a characteristic that at a certain transaction rate, the average transaction latency decreases significantly when the number of shards increases. Therefore, all four methods performs their best in term of latency with the configuration of 16 shards as the number of transactions in each shard is low enough.

Figure 7A:
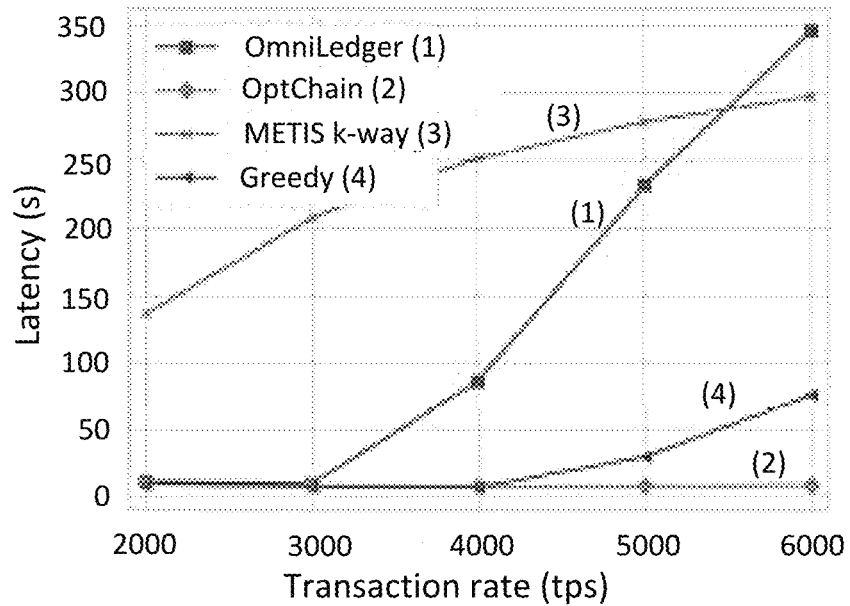
FIGS. 7A-7B show an average transaction latency for (A) a number of shards fixed at 16 and (B) varying transaction rate and number of shards for an exemplary OptChain protocol in accordance with various embodiments of the present disclosure and conventional OmniLedger, Greedy, and Metis k-way protocols in accordance with the present disclosure.

To closely evaluate the latency, the transaction rate is varied while keeping the number of shards at 16 as shown in FIG. 7A. Clearly there exists a considerable gap between OptChain's average latency and other methods' results. OptChain always achieves the best performance comparing to the others. In fact, at the transaction rate of 4000 tps, the system only takes 7 seconds to process a transaction in average. At a low transaction rate (i.e., 2000 to 3000 tps), one can see that all algorithms except for Metis have good latency in general. This is because the system can balance between throughput and transaction rate at these ranges, thus no backlogging happens.

As the rate is increased to 6000 tps, an exemplary transaction sharding algorithm in accordance with the present disclosure still maintains a good latency, while one can see a significant increase in other algorithms. In particular, at 6000 tps, the latency is reduced up to 93% as compared to OmniLedger. This comes from the fact that OmniLedger cannot tolerate 6000 transactions per second in such settings. Thus, the queuing delay (the time spent in a queue) of a transaction will increase overtime and come to infinity. This behavior can also be observed in Greedy. As for Metis, even though it has the least amount of cross-shard transactions, it still gets a really high average latency. This issue can be explained as Metis failed to achieve the temporal balance in the queue size between shards as previously mentioned, since there were only some active shards at a time and exacerbating the final average latency.

Figure 7B:
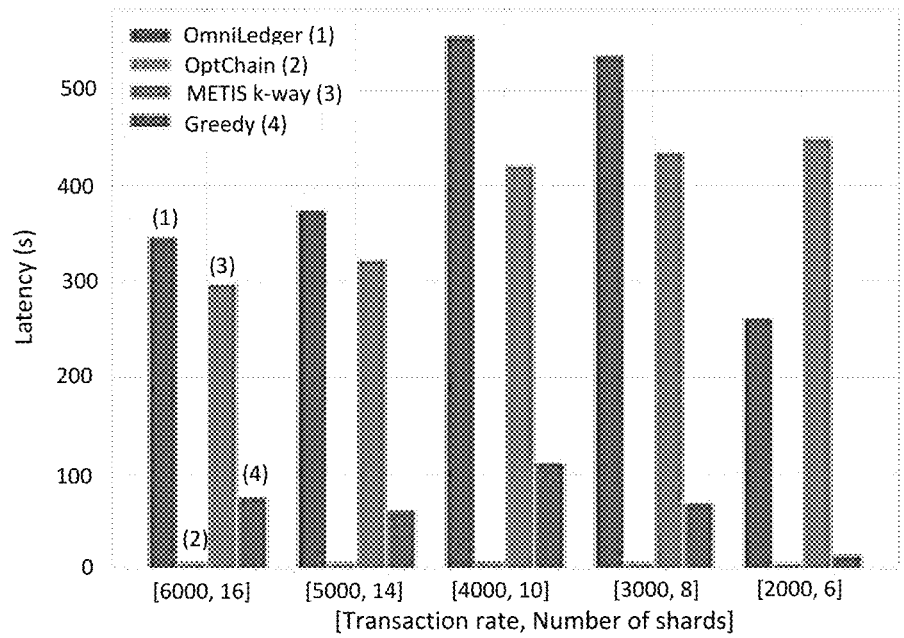

Thereafter, the system's latency is measured with different combinations of transaction rate and number of shards, as shown in FIG. 7B. Specifically, the configuration is set in the same way as FIG. 3A. As can be seen in FIG. 7B, OptChain obtains the best performance in term of balancing the throughput and the transaction rate. At these configurations, the highest average latency of OptChain is only 7.83 seconds at the transaction rate of 6000 tps and 16 shards, while OmniLedger reaches 346.2 seconds at this configuration. In addition, at the transaction rate of 4000 and 10 shards, OptChain reduces up to 98% the latency as compared to OmniLedger.

Figure 8A:
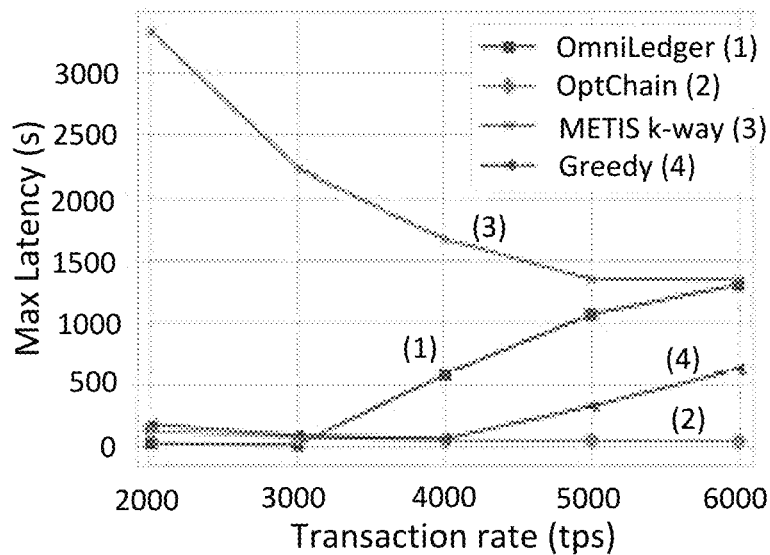
FIGS. 8A-8B show a maximum transaction latency for (A) a number of shards fixed at 16 and (B) a varied transaction rate and number of shards in accordance with the present disclosure.
Figure 8B:
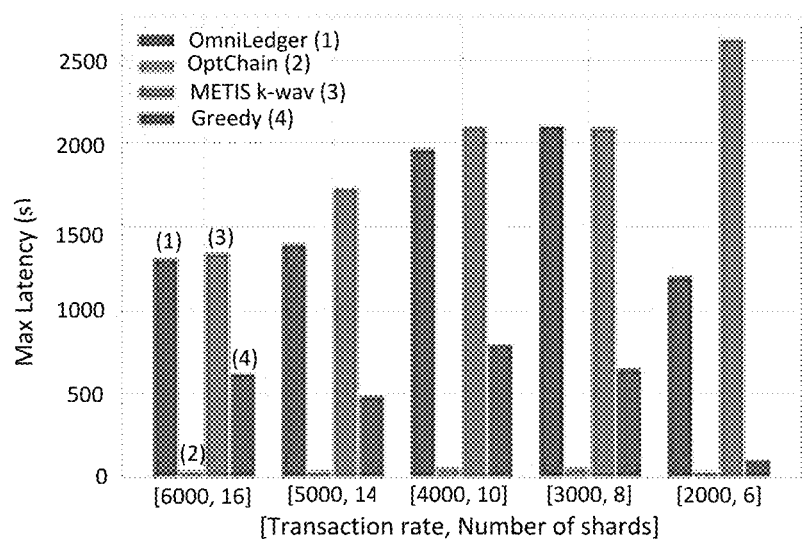

FIG. 8A illustrates the maximum latency to process transactions with 16 shards at different transaction rates. At 6000 tps, OptChain takes at most 46.9 seconds for a transaction while OmniLedger, Metis, and Greedy respectively takes 1309.5, 1345.9, and 628.9 seconds. This result, together with FIGS. 7A-7B, again confirms that an exemplary transaction sharding algorithm significantly reduces the transaction processing latency. Additionally, in FIG. 8B, the result of this metric is plotted at different combinations of transaction rate and number of shards as in FIG. 7B. Among these configurations, the highest latency reached is 69.2 seconds at the transaction rate of 3000 tps and 8 shards. At this point, OmniLedger, Metis, and Greedy respectively takes at most 2102.6, 2092.0, and 662.0 seconds to process one transaction.

Figure 9:
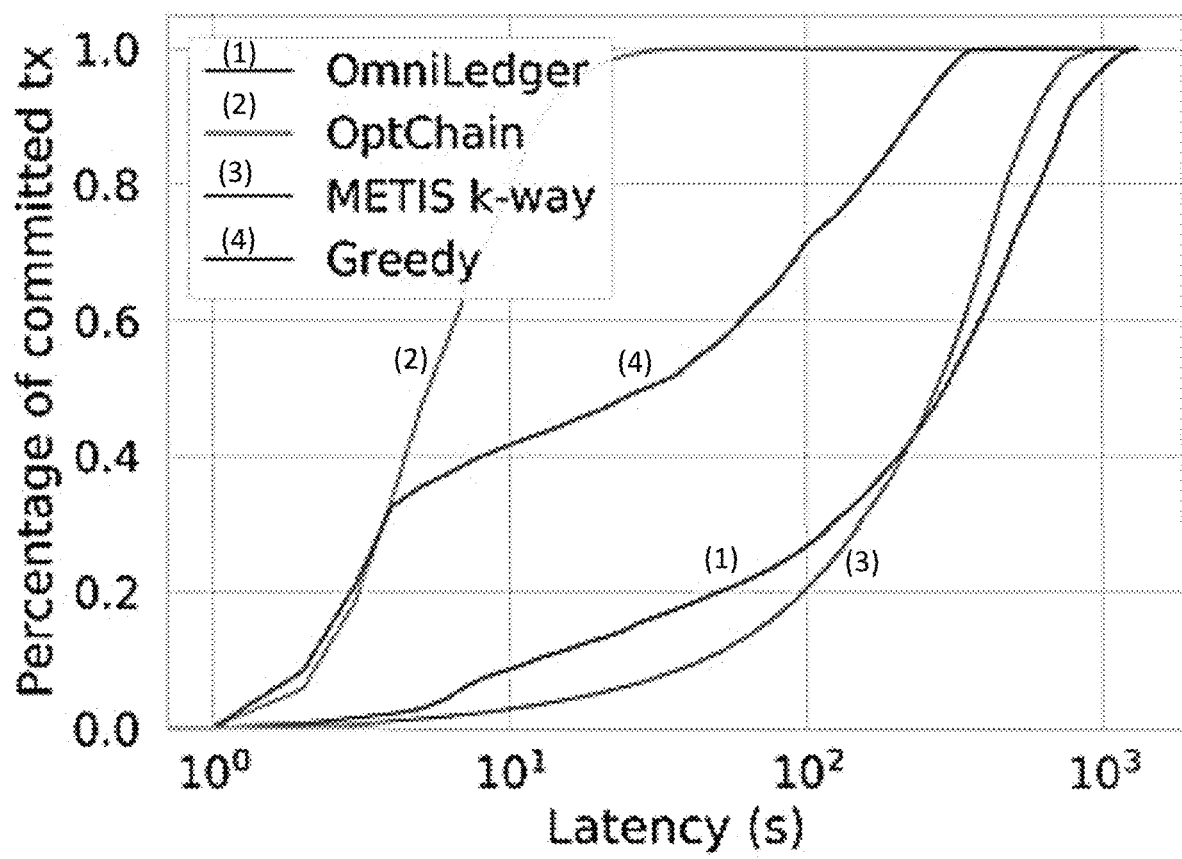
FIG. 9 shows a latency distribution for an exemplary OptChain protocol in accordance with various embodiments of the present disclosure and conventional OmniLedger, Greedy, and Metis k-way protocols in accordance with the present disclosure.

For a more detailed view on the impact of transaction sharding algorithms on system's latency, in FIG. 9, the cumulative distribution of the latency is presented when the shard's number is set to 16 and transaction rate is set to 6000 tps. As can be seen, more than 80% of the transactions are processed within 10 seconds of OptChain. For other algorithms, within this time frame, only 41.2%, 7.9%, and 2.4% of the transactions were completed with Greedy, OmniLedger, and Metis, respectively.

The experiments notably show that an exemplary OptChain protocol significantly outperforms other transaction sharding methods. To be specific, OptChain can reduce up to 93% the confirmation latency and increase 50% the throughput in comparison to OmniLedger. Meanwhile, for a certain transaction rate, OptChain requires less shards than OmniLedger to guarantee the system performance without backlogging.

Figure 10:
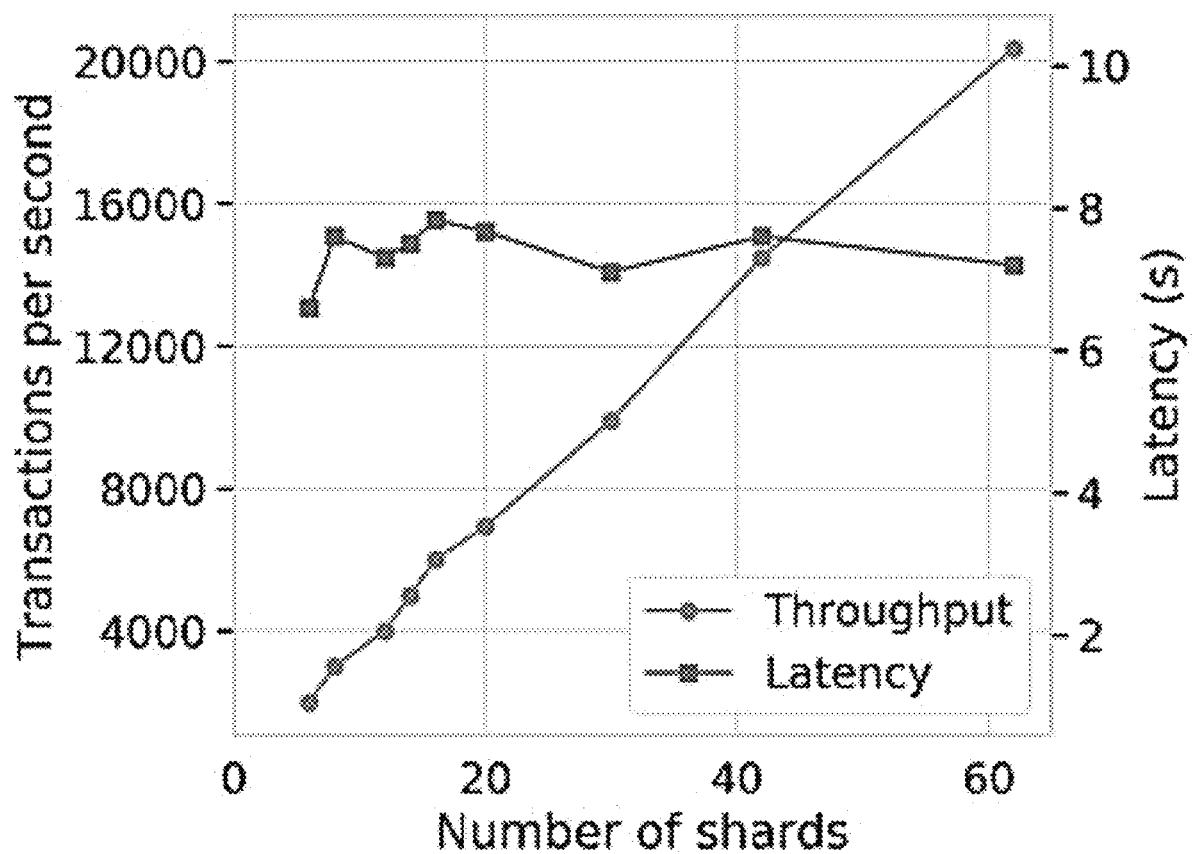
FIG. 10 shows a plotting of throughput and latency values for an exemplary OptChain protocol in accordance with embodiments of the present disclosure.

During experimental analysis, the highest transaction rate OptChain is observed to scale up to (throughput is equal to transaction rate) with multiple number of shards is plotted out in FIG. 10. From the figure, the best throughput of OptChain is almost linear with the number of shards and reaches up to 20,000 tps with 60 shards. Furthermore, when the throughput is comfortable with transaction rate, OptChain guarantees the confirmation delay is never more than 8 seconds and almost constant. Overall, OptChain's good performance results the fact that OptChain is able to concurrently handle two main factors that typically hinder the system performance: (1) reducing cross-TXs and (2) temporally balancing workload between shards.

In summary and in accordance with the present disclosure, OptChain is a scalable protocol to optimally place transactions into shards, which reduces computational cost and confirmation latency as well as temporally balancing workload between shards. In experimental trials, an exemplary OptChain reduces the latency by 93% and increases the throughput by 50% in comparison with the state-of-the-art sharding system OmniLedger. Empirical evaluation demonstrates that OptChain scales smoothly with transaction rate up to 20,000 transactions per seconds with 60 shards while maintaining low latency and potentially handle much higher rate with more shards.

In accordance with an embodiment of the present disclosure, an exemplary transaction sharding method comprises splitting, by one or more computing processors, a distributed ledger into a plurality of parts called shards, wherein each shard is maintained by a subgroup of computer nodes, wherein the distributed ledger is a blockchain; and storing, by the one or more computing processors, a shard across the subgroup of computer nodes associated with the shard. Such a method further comprises assigning, by the one or more computing processors, a new transaction to one of the plurality of shards, wherein assigning the new transaction comprises: iteratively choosing one of the plurality of shards; in each iteration, determining a transaction-to-shard score measuring a probability that a subgroup of computing nodes associated with the chosen shard for the current iteration would be involved in a same-shard transaction for the new transaction; in each iteration, determining a latency-to-shard score by estimating a confirmation latency of the new transaction under the chosen shard for the current iteration; and selecting the new transaction to be assigned to the shard in the plurality of shards that maximizes the transaction-to-shard score while minimizing the latency-to-shard score. The method further includes transmitting, by the one or more computing processors, the new transaction to each of the computer nodes in the subgroup associated with the selected shard for validation.

In general, distributed ledger technology can be utilized across a variety of industries and applications. Any piece of transmitted data across a network could be treated as a transaction, including a data log, video or image data, home appliance data, medical data, healthcare data, and data related to cryptocurrency, smart grids, Internet-of-Things, social networks, etc. In general, transactions can be both financial transactions and wrappers of other kinds of data, e.g. video/image/log/etc.

With respect to computing the transactions-to-shard score and latency-to-shard score and, eventually, deciding/selecting which shard to assign the transaction to, certain embodiments of the present disclosure will have a user, who created the transaction, to compute the scores and decide the placement. In some embodiments, among others, however, the computation/decision is performed by a dedicated load balancing device or computing nodes in the system will agree on or vote for one of the computing nodes to perform the computation/decision based on an underlying protocol.

Figure 11:
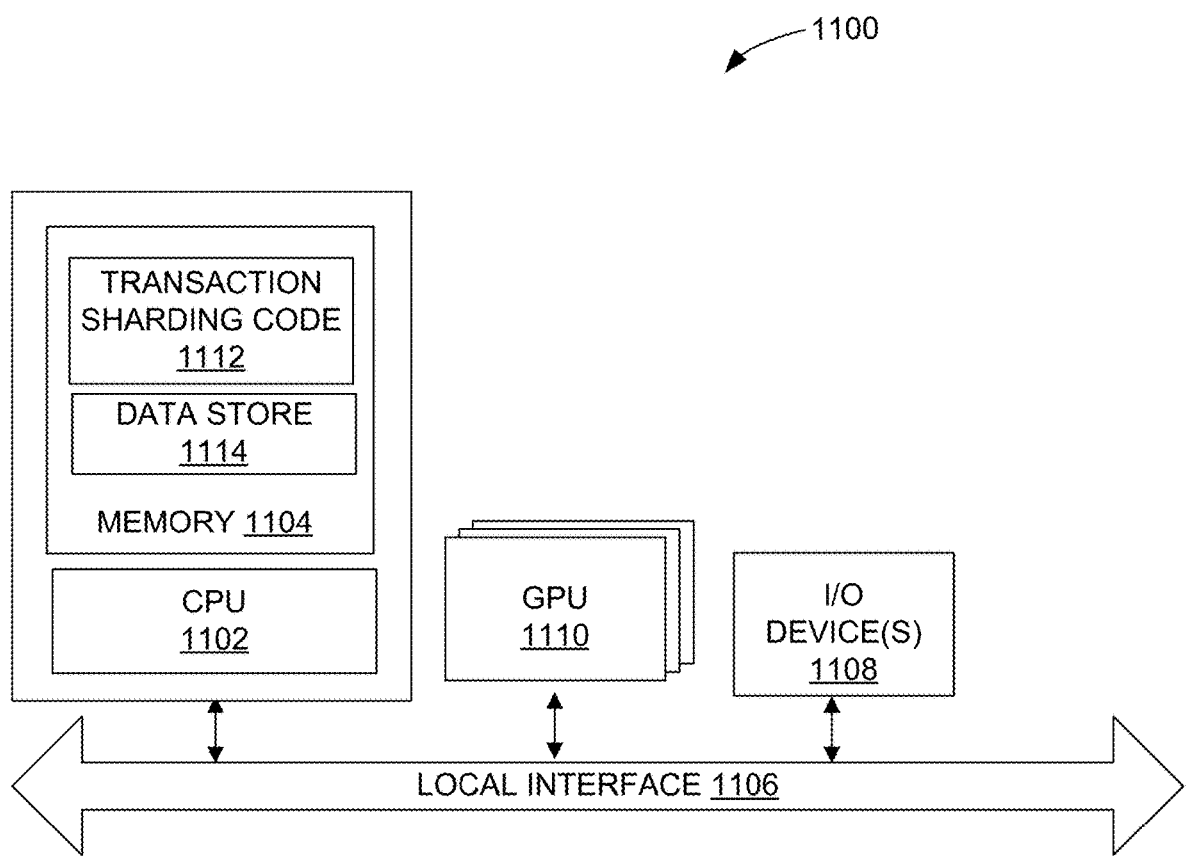
FIG. 11 depicts a schematic block diagram of a computing device that can be used to implement various embodiments of the present disclosure.

FIG. 11 depicts a schematic block diagram of a computing device 1100 that can be used to implement various embodiments of the present disclosure. An exemplary computing device 1100 includes at least one processor circuit, for example, having a processor 1102 and a memory 1104, both of which are coupled to a local interface 1106, and one or more input and output (I/O) devices 1108. The local interface 1106 may comprise, for example, a data bus with an accompanying address/control bus or other bus structure as can be appreciated. The computing device 1100 may further include Graphical Processing Unit(s) (GPU) 1110 that are coupled to the local interface 1106 and may utilize memory 1104 and/or may have its own dedicated memory.

Stored in the memory 1104 are both data and several components that are executable by the processor 1102. In particular, stored in the memory 1104 and executable by the processor 1102 are code for implementing a transaction sharding protocol 1112 ("OptChain"). Also stored in the memory 1104 may be a data store 1114 and other data. In addition, an operating system may be stored in the memory 1104 and executable by the processor 1102. The I/O devices 1108 may include input devices, for example but not limited to, a keyboard, mouse, etc. Furthermore, the I/O devices 1108 may also include output devices, for example but not limited to, a printer, display, etc.

Certain embodiments of the present disclosure can be implemented in hardware, software, firmware, or a combination thereof. Accordingly, certain embodiments are implemented in software or firmware that is stored a computer-readable medium, such as in a memory, and that is executed by a suitable instruction execution system (e.g., one or more computing processors). If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of the present disclosure includes embodying the functionality of embodiments of the present disclosure in logic embodied in hardware or software-configured mediums.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure.

The invention claimed is:

1. A method comprising:
splitting, by one or more computing processors, a distributed ledger into a plurality of shards, wherein an individual shard is maintained by a subgroup of computer nodes;
storing, by the one or more computing processors, a shard across the subgroup of computer nodes associated with the shard;
assigning, by the one or more computing processors, a new transaction to one of the plurality of shards, wherein assigning the new transaction comprises:
iteratively choosing one of the plurality of shards;
in each iteration, determining a transaction-to-shard score that is an estimate of a probability that a subgroup of computing nodes associated with the chosen shard for a current iteration would be involved in a same-shard transaction for the new transaction;
in each iteration, determining a latency-to-shard score that is an estimate of a confirmation latency of the new transaction under the chosen shard for the current iteration; and
selecting the new transaction to be assigned to the shard in the plurality of shards based on a combination of the transaction-to-shard score and the latency-to-shard score; and
transmitting, by the one or more computing processors, the new transaction to each of the computer nodes in the subgroup associated with the selected shard for validation.

2. The method of claim 1, wherein the selected shard maximizes the transaction-to-shard score while minimizing the latency-to-shard score.

3. The method of claim 1, further comprising appending the new transaction to the selected shard after validation by the subgroup associated with the selected shard.

4. The method of claim 1, wherein the new transaction comprises a computer transaction.

5. The method of claim 1, wherein the new transaction comprises a data log.

6. The method of claim 1, wherein the new transaction comprises a video or imaging data.

7. The method of claim 1, wherein the new transaction comprises home appliance data.

8. The method of claim 1, further comprising representing the new transaction as a first node in a directed acyclic graph in which the first node is connected to a second node in the directed acyclic graph by an edge that represents that the first node uses the second node as an input in its transaction, wherein the transaction-to-shard score is based on determining a relative importance of the first node within the directed acyclic graph.

9. A system comprising:
one or more computing processors; and
one or more memory storage elements;
wherein the one or more computing processors are configured to:

split a distributed ledger into a plurality of shards, wherein each shard is maintained by a subgroup of computer nodes and stored in the one or more storage elements;

store a shard across the subgroup of computer nodes associated with the shard;

assign a new transaction to one of the plurality of shards, wherein assigning the new transaction comprises:

iteratively choosing one of the plurality of shards;

in each iteration, determining a transaction-to-shard score that is an estimate of a probability that a subgroup of computing nodes associated with the chosen shard for a current iteration would be involved in a same-shard transaction for the new transaction;

in each iteration, determining a latency-to-shard score that is an estimate of a confirmation latency of the new transaction under the chosen shard for the current iteration; and selecting the new transaction to be assigned to the shard in the plurality of shards based on a combination of the transaction-to-shard score and the latency-to-shard score; and transmit the new transaction to each of the computer nodes in the subgroup associated with the selected shard for validation.

10. The system of claim 9, wherein the selected shard maximizes the transaction-to-shard score while minimizing the latency-to-shard score.

11. The system of claim 9, wherein the one or more computing processors are further configured to append the transaction to the selected shard after validation by the subgroup associated with the selected shard.

12. The system of claim 9, wherein the transaction comprises a computer transaction.

13. The system of claim 9, wherein the transaction comprises a data log, a video or image data, or home appliance data.

14. The system of claim 9, wherein the one or more computing processors are further configured to represent the new transaction as a first node in a directed acyclic graph in which the first node is connected to a second node in the directed acyclic graph by an edge that represents that the first node uses the second node as an input in its transaction, wherein the transaction-to-shard score is based on determining a relative importance of the first node within the directed acyclic graph.

15. A non-transitory computer-readable medium having instructions stored thereon that, in response to execution by a computer-based system, cause the computer-based system to perform operations comprising:

splitting a distributed ledger into a plurality of shards, wherein an individual shard is maintained by a subgroup of computer nodes;

storing a shard across the subgroup of computer nodes associated with the shard;

assigning a new transaction to one of the plurality of shards, wherein assigning the new transaction comprises:

iteratively choosing one of the plurality of shards;

in each iteration, determining a transaction-to-shard score that is an estimate of a probability that a subgroup of computing nodes associated with the chosen shard for a current iteration would be involved in a same-shard transaction for the new transaction;

in each iteration, determining a latency-to-shard score that is an estimate of a confirmation latency of the new transaction under the chosen shard for the current iteration; and selecting the new transaction to be assigned to the shard in the plurality of shards based on a combination of the transaction-to-shard score and the latency-to-shard score; and transmitting the new transaction to each of the computer nodes in the subgroup associated with the selected shard for validation.

16. The non-transitory computer-readable medium of claim 15, wherein the selected shard maximizes the transaction-to-shard score while minimizing the latency-to-shard score.

17. The non-transitory computer-readable medium of claim 15, wherein the operations further comprise appending the transaction to the selected shard after validation by the subgroup associated with the selected shard.

18. The non-transitory computer-readable medium of claim 15, wherein the transaction comprises a computer transaction.

19. The non-transitory computer-readable medium of claim 15, wherein the transaction comprises a data log, a video or image data, or home appliance data.

20. The non-transitory computer-readable medium of claim 15, wherein the operations further comprise representing the new transaction as a first node in a directed acyclic graph in which the first node is connected to a second node in the directed acyclic graph by an edge that represents that the first node uses the second node as an input in its transaction, wherein the transaction-to-shard score is based on determining a relative importance of the first node within the directed acyclic graph.

* * * * *